Aug. 1, 1967  G. L. FLANAGAN  3,333,502
NON-MAGNETIC COMPASS COMPRISING A MOVABLE PRISM MOUNTED ABOVE A DISPLAY SURFACE
Filed April 14, 1966

George L. Flanagan
INVENTOR.

United States Patent Office 3,333,502
Patented Aug. 1, 1967

3,333,502
NON-MAGNETIC COMPASS COMPRISING A MOVABLE PRISM MOUNTED ABOVE A DISPLAY SURFACE
George L. Flanagan, 15 W. 10th St.,
Kennewick, Wash. 99336
Filed Apr. 14, 1966, Ser. No. 542,631
2 Claims. (Cl. 88—2.2)

This application is a continuation-in-part of my prior copending application U.S. Ser. No. 273,600, filed Apr. 17, 1963 and relates to an optical compass device for indicating direction with respect to a reference source of light such as the sun.

It is therefore a primary objective of the present invention to provide an optical compass effective to indicate direction without reliance upon the magnetic field of the earth, the compass device capable of being utilized independently of or in conjunction wtih a magnetic compass device for checking the accuracy thereof.

Another object of the present invention is to provide an optical compass element or a prism device operative to produce a star-like spectral pattern elongated in one reference direction by proper orientation of the prism device with respect to a reference source of light. The spectral pattern is therefore adapted to be produced in response to a predetermined orientation of the prism device with respect to the reference source of light in order to provide a direction indication.

An additional object of the present invention is to provide a prismatic optical compass device capable of producing a spectral pattern elongated in a reference direction when the compass device is properly orientated with respect to the sun, the direction indicating pattern being formed despite the movement of the sun with respect to the earth within its limited arc in accordance with seasonable changes. The spectral pattern is produced because of a special design of the optical element of the non-magnetic compass.

In accordance with the foregoing objects, the prismatic optical element of the non-magnetic compass is in the form of an upwardly converging, equilateral pyramid having an apex through which a central axis extends along the altitude of the pyramid and being formed by planar side faces receiving the rays of light from a reference source of light, the base of the pyramid being connected to a downwardly converging truncated pyramid portion also having equilateral side faces through which refracted rays of light are emitted to form the star-like spectral pattern aforementioned. The side faces of the upwardly converging pyramid are disposed at such an angle to the altitude of the pyramid that rays of light emanating from the source of light form a star-like pattern on a surface intersected by the central axis of the prism. When the rays are inclined at some angle to the central axis in a directional plane, the spectral pattern will be elongated in the direction of the plane. Therefore, orientation adjusting facilities may be provided for appropriately adjusting the position of the prismatic element in accordance with time in order to to accommodate movement of the sun as the source of light.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
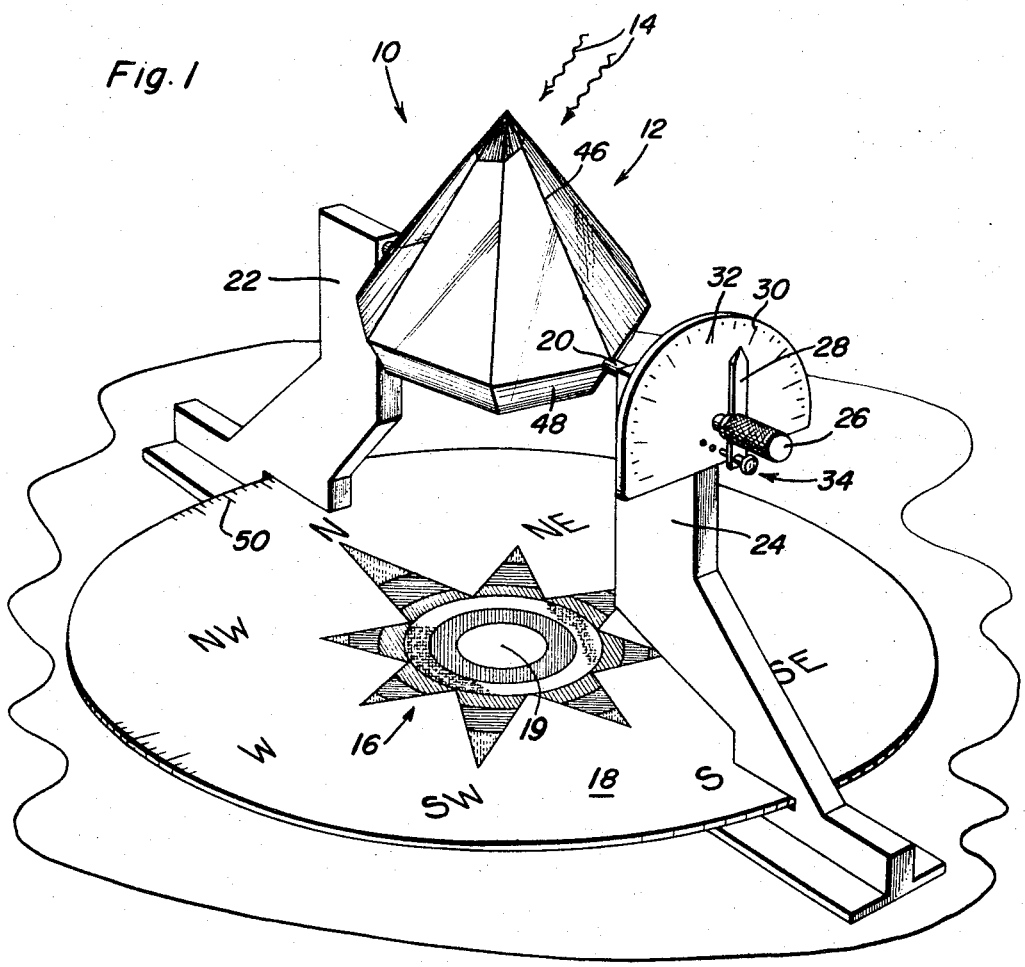
FIGURE 1 is a perspective view of a simplified proposed arrangement for a compass device in accordance with the principles of the present invention.

Referring now to the drawings in detail, it will be observed from FIGURE 1 that the compass device generally referred to by reference numeral 10 includes an optical prismatic element generally referred to by reference numeral 12 adapted to receive radiant energy 14 from a southerly direction for refraction thereof into a star-like spectral pattern generally referred to by reference numeral 16 on a direction indicating display surface 18. The central axis that extends through the prismatic optical element 12, forms the center 19 of the direction indicating pattern 16 which may be displaced by adjusting the position of the prismatic element 12 about an orientating axis extending through the shaft 20. The shaft 20 is journaled between a pair of mounting brackets 22 and 24 of any suitable shape or construction. Angular adjustment of the optical element 12 about the orienting axis, is effected by means of an adjustment knob 26 having an indicator 28 fixed thereto cooperating with indicia mounted on a scale plate 32 fixedly secured for example to the bracket 24. The element 12 may be locked in any adjusted position by a locking mechanism 34. Also, the display surface 18 may be adjustably orientated relative to the brackets by angular displacement in a plane parallel to the axis extending through the orientation adjustment shaft 20. spect to the sun, the direction indicating pattern being formed despite the movement of the sun with respect to the earth within its limited arc in accordance with seasonable changes. The spectral pattern is produced because of a special design of the optical element of the non-magnetic compass.

Figure 2:
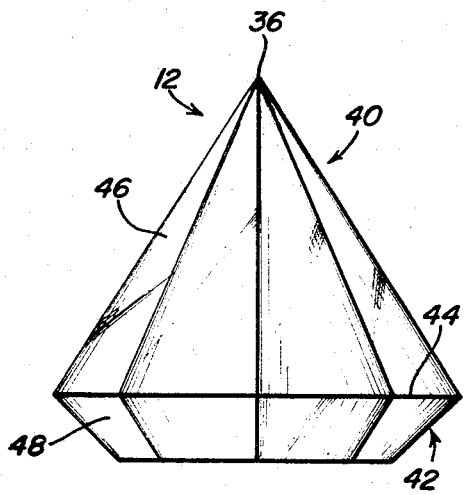
FIGURE 2 is a side elevational view of the prismatic element itself.

It will be observed from both FIGS. 1 and 2, that the optical element 12 includes an upper pyramid portion generally referred to by reference numeral 40 and a lower truncated pyramid portion 42. The pyramid portions are interconnected at a base plane 44 perpendicular to the altitude of the pyramid portions. The upper pyramid portion is in the form of an eight-sided, equilateral pyramid extending from the base plane 44 to an apex 36 presenting a plurality of azimuth side faces 46 facing different directions. These azimuth faces are disposed at such an angle to the altitude or central axis of the pyramid portion 40 that rays of light impinging thereon will be refracted through the optical element emerging from the sides 48 of the truncated pyramid portion 42 on the opposite sides of the central axis to form the spectral pattern 16 aforementioned. When rays of light from the reference source impinge upon the sides 46 of optical element at some inclination to its central axis relative to a directional plane, the spectral pattern produced on the display surface 18 will be radially elongated in the direction of the plane from the center 19. Thus, by properly orientating the optical element with respect to the reference source of light, a direction indicating spectral pattern is produced.

It will be appreciated from the foregoing description, that the device of the present invention may utilize the sun as a reference source of light in order to provide a geographical direction indication from the elongation of the spectral pattern 16 on the display surface 18. This will of course require proper adjustment of the position of the optical prism element 12 and the display surface 18 relative to each other and relative to the sun in view of the continuous relative movement between the earth and the sun with respect to time. Accordingly, the described arrangement of the present invention accommodates relative angular adjustment between the display surface 18 and the brackets 22 and 24 as well as angular adjustment of the optical prism element 12 relative to the brackets about the orientating axis of adjustment shaft 20. For example, it will be apparent that at 12 noon when the sun is said to be directly overhead at any location on the surface of the earth, the optical element 12 could be adjusted by means of the knob 26 so that its central axis is substantially in a vertical plane common with that of the sun as a point source of light. The rays of light from the sun would then impinge upon the optical element parallel to such common plane but at an inclination to the central axis of the optical element, the angle of inclination being dependent upon the season of the year and the distance from the equator at which the compass device is located. The spectral pattern 16 would then be elongated in one direction as illustrated in FIG. 1 assuming the compass device is located in the northern hemisphere. It will be appreciated therefore that a direction indication may be provided for a given time during daylight hours by angularly adjusting the angular position of the brackets 22 and 24 relative to the display surface 18 in accordance with the time of day, and then appropriately adjusting the angular position of the optical element about the axis through shaft 20. Accordingly, the scales 30 and 50 on the scale plate 32 and display surface 18 respectively, may be appropriately calibrated for this purpose. It will of course be appreciated that other position adjusting arrangement may be adopted in accordance with the present invention taking advantage of the formation of a spectral pattern produced by light refracted through the optical element 12 on a display surface such as surface 18.

The ability of the device of the present invention to achieve the aforementioned objectives arises because of the use of an optical element having a plurality of inclined input faces 46 and output faces 48 symmetrically disposed about a central axis with facilities to adjustably position the optical element by displacement of its central axis intersecting the display surface. Light impinging on the symmetrically disposed input side faces of the optical element will be refracted through the optical element and emerge therefrom to form a spectral light pattern or image on the display surface elongated in one direction as long as a non-symmetrical relationship exists between the optical element and the source of light.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a source of light, a prism having a plurality of input and output sides equal in number to a multiple of four facing different directions relative to a central axis, means positioning the prism about a positioning axis in non-symmetrical relation to the source of light for refraction of light entering said input sides, and display means mounted in spaced relation to the prism for presenting a spectral pattern on a surface parallel to said positioning axis produced by refracted light emerging from the output sides of the prism which pattern is elongated in one direction relative to a center defined by the intersection of said central axis with the surface, said input sides being planar faces of an equilateral pyramid converging in a direction away from the display means in symmetric relation to the central axis, said output sides of the prism being equal in number to the input sides and being planar faces of an equilateral pyramid truncated perpendicular to said central axis and converging toward the display means.

2. The combination of claim 1 wherein said source of light is moving, and means connected to the prism and the display means for adjustably orientating the same relative to the instantaneous position of the source.

No references cited.

JEWELL H. PEDERSEN, *Primary Examiner.*

O. B. CHEW, *Assistant Examiner.*